(12) United States Patent
Yoshida

(10) Patent No.: US 6,246,467 B1
(45) Date of Patent: Jun. 12, 2001

(54) RANGEFINDER APPARATUS

(75) Inventor: Hideo Yoshida, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/396,736

(22) Filed: Sep. 15, 1999

(30) Foreign Application Priority Data

Sep. 29, 1998 (JP) .................................................. 10-275583

(51) Int. Cl.$^7$ ................................ G01C 3/00; G01C 3/08; G03B 13/36
(52) U.S. Cl. .................... 356/3.01; 250/201.6; 356/4.01; 356/3.04; 396/129; 396/106
(58) Field of Search ...................... 396/129, 106; 356/3.017, 5.15; 250/201.47, 201.8

(56) References Cited

U.S. PATENT DOCUMENTS 5,832,324 * 11/1998 Shimizu et al. ................... 396/129
B1 6,173,123 * 1/2001 Yoshida ................................ 396/106

FOREIGN PATENT DOCUMENTS 7-181038 7/1995 (JP) .
7-229735 8/1995 (JP) .

* cited by examiner

Primary Examiner—Stephen C. Buczinski
(74) Attorney, Agent, or Firm—Leydig, Voit & Mayer, Ltd.

(57) ABSTRACT

A rangefinder apparatus, which projects light toward a range-finding object, detects light reflected from the range-finding object, and measures the distance to the range-finding object according to a position where the light is detected, includes a step-up regulator for raising the power source voltage of a battery; a step-down regulator for receiving the raised voltage outputted from the step-up regulator and outputs a depressed voltage lower than the raised voltage; an autofocus integrated circuit actuated upon receiving the depressed voltage, for outputting a signal corresponding to the distance to the range-finding object according to the signal from a light-detector; and a stabilizing capacitor, connected between a location near a power terminal of the integrated circuit receiving the depressed voltage and a location near a grounding terminal of the integrated circuit, for stabilizing the depressed voltage. Consequently, the power source voltage can efficiently be stabilized with a small number of capacitors.

2 Claims, 5 Drawing Sheets

RANGEFINDER APPARATUS

BACKGROUND OF THE INVENTION

1. Field of the Invention

The present invention relates to a rangefinder apparatus used in a camera or the like.

2. Related Background Art

In an autofocus mechanism (AF mechanism) of a camera or the like, a rangefinder apparatus for measuring the distance to an object by a trigonometric system is used in general. In this rangefinder apparatus, a light-emitting device projects an infrared ray toward the object, a light-receiving device receives reflected light of the ray and outputs a signal according to a position at which the light is received, and an arithmetic circuit or the like measures the distance to the object according to this signal.

In the rangefinder apparatus, a stable power source voltage is necessary for actuating the arithmetic circuit and the like, whereby a regulator IC outputting a constant voltage or the like is used.

SUMMARY OF THE INVENTION

In the above-mentioned rangefinder apparatus, however, there is a possibility that accurate range-finding results may not be obtained when the power source voltage supplied to an amplifying circuit, an arithmetic circuit, and the like fluctuates.

Therefore, it is an object of the present invention to resolve this problem and provide a range finder apparatus which can efficiently stabilize the power source voltage.

In order to achieve this object, the rangefinder apparatus in accordance with one aspect of the present invention comprises light-emitting means for projecting a ray toward a range-finding object; light-receiving means for receiving reflected light of the ray projected from the light-emitting means to the range-finding object and outputting a signal according to a position at which the light is received; a battery for supplying a power source voltage; step-up means for raising the power source voltage of the battery; step-down means for receiving the raised voltage outputted from the step-up means and outputting a depressed voltage which is lower than the raised voltage; signal processing means, actuated upon receiving the depressed voltage, for outputting a signal corresponding to a distance to the range-finding object or a signal for generating the signal corresponding to the distance to the range-finding object; and a stabilizing capacity, connected between near a power terminal of the signal processing means receiving the depressed voltage and near a grounding terminal of the signal processing means, for stabilizing the depressed voltage; wherein the depressed voltage is fed into the light-receiving means by way of a wire drawn out from a connecting portion of the stabilizing capacity.

The rangefinder apparatus in accordance with another aspect of the present invention comprises light-emitting means for projecting a ray toward a range-finding object; light-receiving means for receiving reflected light of the ray projected from the light-emitting means to the range-finding object and outputting a signal according to a position at which the light is received; a battery for supplying a power source voltage; step-up means for raising the power source voltage of the battery; step-down means for receiving the raised voltage outputted from the step-up means and outputting a depressed voltage which is lower than the raised voltage; signal processing means, actuated upon receiving the depressed voltage, for outputting a signal corresponding to a distance to the range-finding object or a signal for generating the signal corresponding to the distance to the range-finding object; and a stabilizing capacity, connected between near a power terminal of the signal processing means receiving the depressed voltage and near a grounding terminal of the signal processing means, for stabilizing the depressed voltage; wherein the depressed voltage is fed into an electronic component other than the signal processing means by way of a wire drawn out from a connecting portion of the stabilizing capacity.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
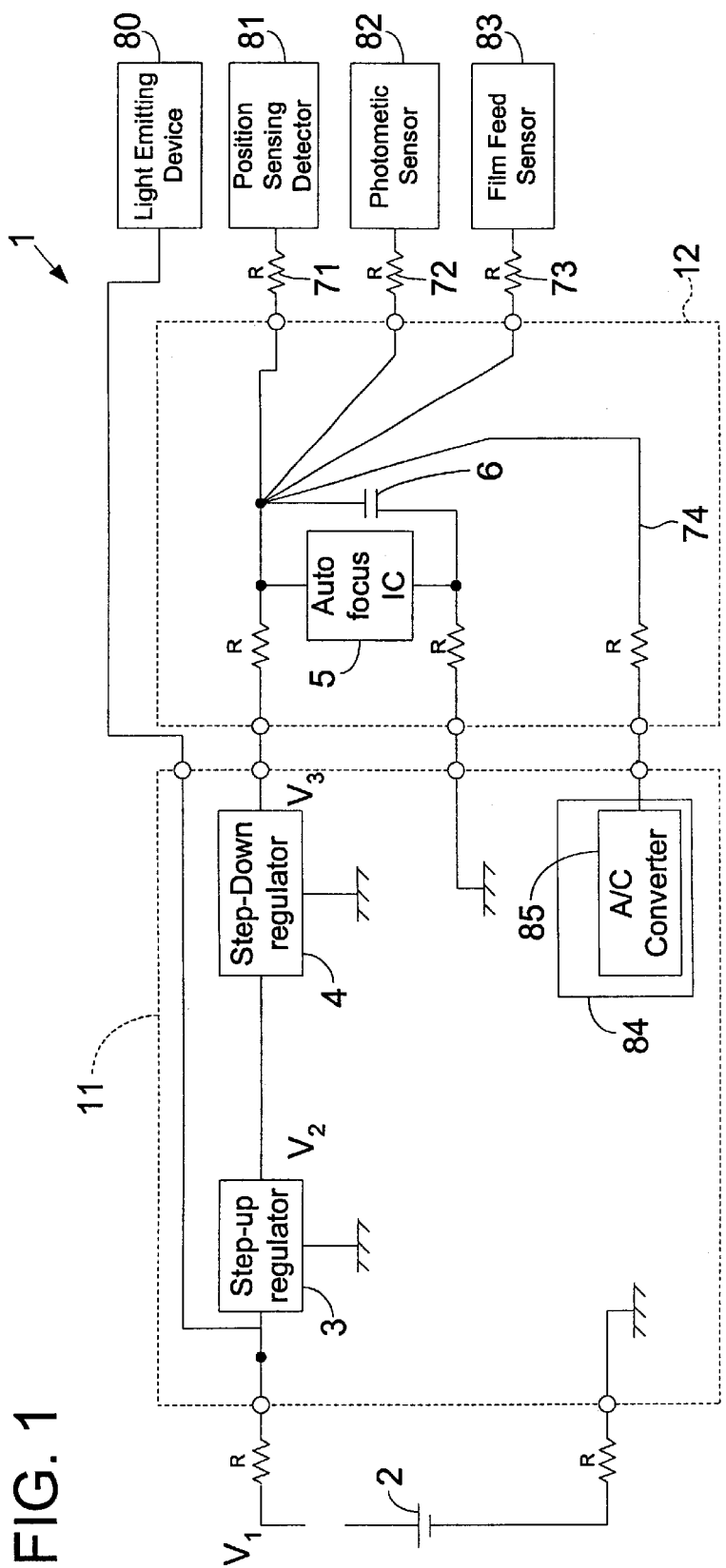
FIG. 1 is an explanatory view of a rangefinder apparatus.

In the following, embodiments of the present invention will be explained with reference to the accompanying drawings. Constituents identical to each other among the drawings will be referred to with numerals or letters identical to each other without their overlapping explanations repeated. Also, dimensional ratios in the drawings do not always match those explained.

First Embodiment

Figure 2:
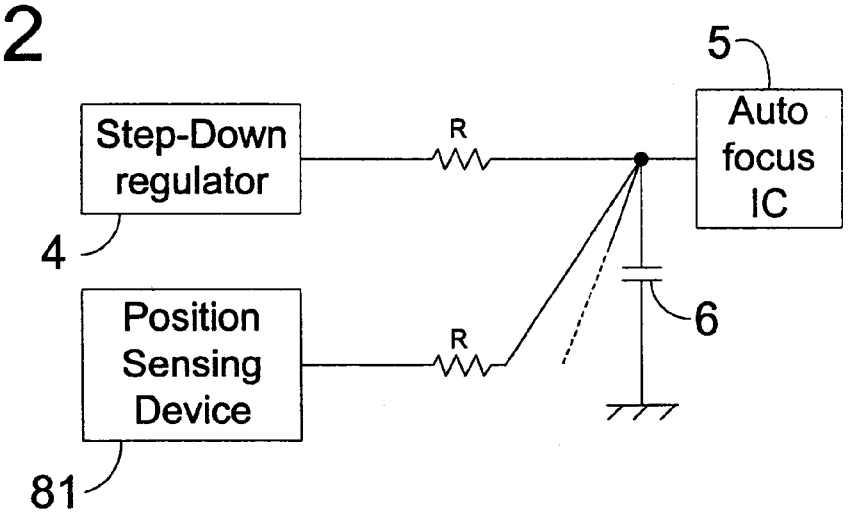
FIG. 2 is a diagram showing electric connections among the step-down regulator, AFIC, and stabilizing capacity in the rangefinder apparatus.

FIG. 1 is a schematic view of the electric configuration of the rangefinder apparatus 1 in accordance with the first embodiment, whereas FIG. 2 is a view showing electric connections among the step-down regulator, AFIC, and stabilizing capacity in the rangefinder apparatus 1.

The rangefinder apparatus 1 is used for an autofocus mechanism of a camera, and is equipped with a battery 2 as shown in FIG. 1. The battery 2 is one contained in the camera and is used for supplying a power source voltage to the rangefinder apparatus 1 and the like disposed within the camera. The positive and negative terminals of the battery 2 are connected to a first printed circuit board 11. Here, a wiring resistance R on the order of 0.5 to 1.0 Ω is generated between the battery 2 and the first printed circuit board 11. In FIG. 1, each R indicates a wiring resistance.

A step-up regulator 3 is disposed in the first printed circuit board 11. The step-up regulator 3 receives the output voltage V1 of the battery 2 and outputs a raised voltage V2 which is higher than the output voltage V1. For example, in the case where the output voltage V1 of the battery 2 is a voltage not higher than 5 V, the output voltage V1 of the battery 2 is raised to 5 V by the step-up regulator 3 so as to actuate a microprocessor and the like. As the step-up regulator 3, a switching regulator is used, for example.

A step-down regulator 4 is connected to the output side of the step-up regulator 3. The step-down regulator 4 receives the output voltage V2 of the step-up regulator 3 and outputs a depressed voltage V3 which is lower than the output voltage V2. As various electronic components are actuated with the depressed voltage V3 that is lower than the raised voltage V2, normal operations of the electronic components are reliably secured without being influenced by the noise occurring in the raised voltage V2. A wiring resistance R similar to that mentioned above occurs in the wire between the step-up regulator 3 and the step-down regulator 4.

The output side of the step-down regulator 4 is wired from the first printed circuit board 11 to a second printed circuit board 12, so as to be connected to an AFIC (autofocus IC) 5. The AFIC 5 is actuated upon receiving the depressed voltage V3 and outputs a signal corresponding to the distance to the range-finding object according to a signal from a position sensing device (hereinafter referred to as "PSD") 81, which is a light-receiving means, so as to function as a signal processing means. A wiring resistance R similar to those mentioned above occurs in the wire between the step-down regulator 4 and the AFIC 5.

Here, "signal processing means" refers to one which is actuated upon receiving the depressed voltage V3, so as to output a signal corresponding to the distance to the range-finding object or a signal for generating the signal corresponding to the distance to the range-finding object. Therefore, those functioning as the signal processing means include not only the whole AFIC 5 but also its input stage portion, by itself, such as the first-stage amplifier, I/V converter (current/voltage converter), or the like built in the AFIC 5; a combination of its input-stage portion and arithmetic portion; and a combination of its input-stage portion, arithmetic portion, and integrating portion.

Connected to the wire between near the power terminal of the AFIC 5 and near the grounding terminal thereof is a stabilizing capacity 6. The stabilizing capacity 6 is mainly used for stabilizing the depressed voltage V3 supplied to the AFIC 5. Those having a capacity of about 10 $\mu F$, such as tantalum capacitor, for example, are used therefor.

Since the stabilizing capacitor 6 is installed in the wire between near the power terminal of the AFIC and near the grounding terminal thereof, the voltage fluctuation of the depressed voltage V3 supplied to the AFIC 5 is suppressed, whereby the noise is eliminated. As a consequence, normal operations of the AFIC 5, which is likely to be influenced by power source fluctuations and the like, can reliably be secured.

A wire 71 is drawn out from near the connecting portion of the stabilizing capacity 6 connected to the power terminal of the AFIC 5, whereas the PSD 81 is connected to the front end side thereof. The PSD 81 is a light-receiving means for receiving reflected light of the ray projected from a light-emitting device 86 to the range-finding object and outputting a signal according to a position at which the light is received. The PSD 81 is actuated as the depressed voltage V3 is supplied thereto. Also, a wire 72 is drawn out from near the connecting portion of the stabilizing capacity 6, whereas a photometric sensor 82 is connected to the front end side thereof. The photometric sensor 82 is a light-intensity-detecting device, which is made of CdS or the like, and is actuated as the depressed voltage V3 is supplied thereto.

On the other hand, a wire 73 is drawn out from near the connecting portion of the stabilizing capacity 6, whereas a film feed sensor 83 is connected to the front end side thereof. The film feed sensor 83 detects the state of feeding of the photographic film loaded in the camera or the like, and a photo-interrupter is used therefor, for example. The film feed sensor 83 is actuated as the depressed voltage V3 is supplied thereto. Further, a wire 74 is drawn out from near the connecting portion of the stabilizing capacity 6, whereas an AD converter 85 built in a microprocessor 84 is connected to the front end side thereof. The AD converter 85 receives detection signals of various sensors and converts them into digital signals. The AD converter 85 operates with the depressed voltage V3 as its reference voltage.

As shown in FIG. 2, when the wires 71 to 74 are drawn out, independently from each other, from near the connecting portion of the stabilizing capacity 6 connected to the power terminal of the AFIC 5, so that the depressed voltage V3 is supplied to electronic components such as the PSD 81, a common impedance can be prevented from occurring, whereby the power source voltage of the AFIC 5 can be stabilized, and the stable power source voltage can be supplied to each electronic component. Consequently, the power source voltage can efficiently be stabilized in each electronic component of the rangefinder apparatus 1.

To the input side of the step-up regulator 3, on the other hand, a light-emitting device 86 is connected by way of the first printed circuit board 11. The light-emitting device 86 projects a ray toward the range-finding object, and an LED emitting an infrared ray may be used therefor, for example. The light-emitting device 86 is actuated as the output voltage V1 of the battery 2 is supplied thereto.

Figure 3:
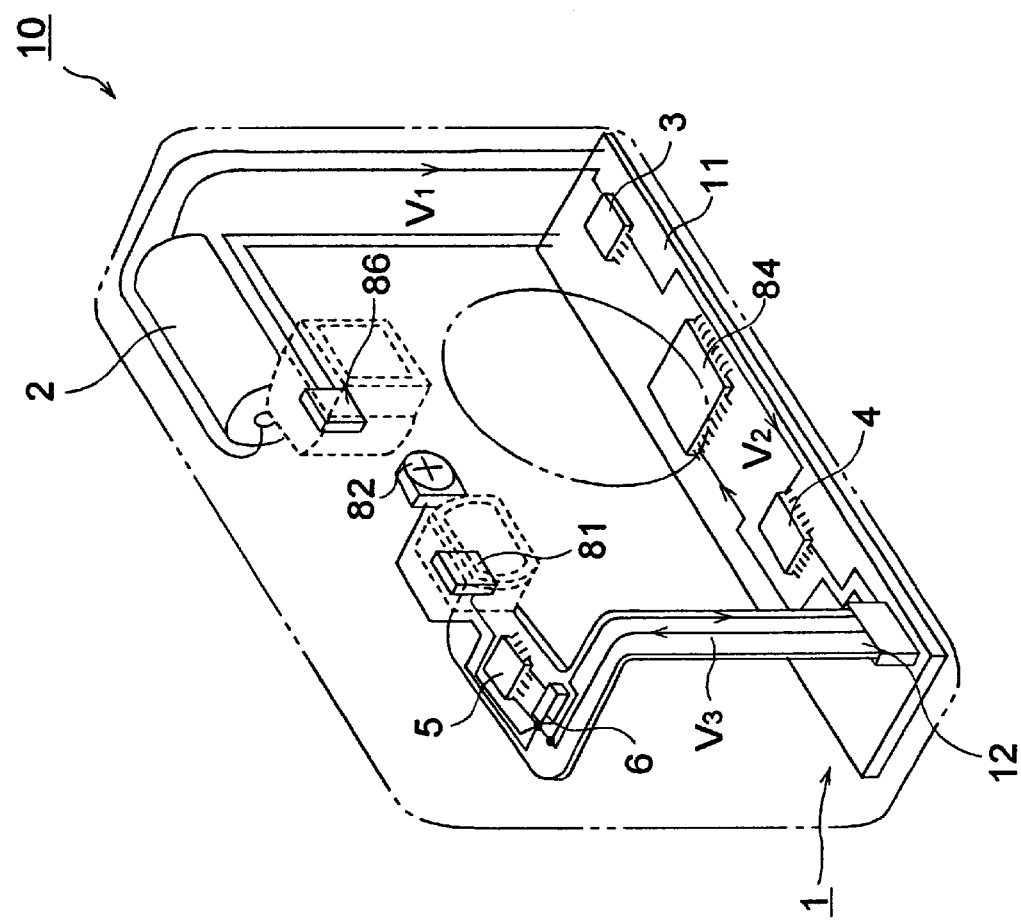
FIG. 3 is an explanatory view of a camera equipped with the rangefinder apparatus.

FIG. 3 is a schematic view of a camera equipped with the rangefinder apparatus in accordance with the present invention.

As shown in FIG. 3, the camera 10 is a still camera, whereas the battery 2 is installed in the upper right portion of the camera 10. The positive and negative terminals of the battery 2 are connected to the right corner of the first printed circuit board 11 by way of their respective leads. The first printed circuit board 11 is disposed near the bottom face of the camera 10. The step-up regulator 3, microprocessor 84, and step-down regulator 4 are disposed on the first printed circuit board 11.

The second printed circuit board 12 is connected to the left corner of the first printed circuit board 11 by way of a connector. A flexible board is used as the second printed circuit board 12, so as to extend upward along the front face of the camera and bend rearward at the upper portion thereof. The second printed circuit board 12 is provided with the AFIC 5 and the stabilizing capacity 6.

Disposed in the upper portion of the camera 10 are the PSD 81, photometric sensor 82, and light-emitting device 86. The light-emitting device 86 is connected to the rear right portion of the first printed circuit board 11 by way of a lead or the like.

Thus, electronic components such as the step-down regulator 4, AFIC 5, PSD 81, and the like are connected to each other through long power wires and grounding wires. As a consequence, it has been considered difficult to stabilize the power source voltage for actuating these components. However, as the stabilizing capacity 6 is disposed at the power source wiring portion near the AFIC 5, which is likely to be influenced by fluctuations in the power source voltage, the power source voltage can be stabilized efficiently.

Figure 6:
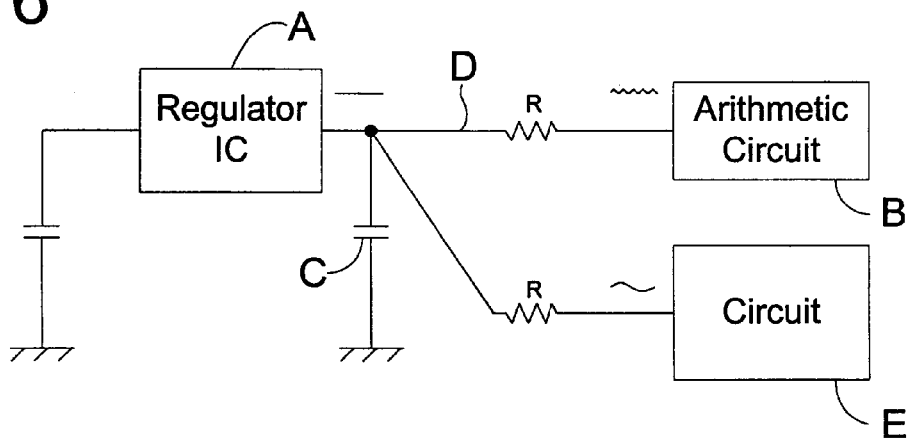
FIG. 6 is an explanatory view of related art.

In a conventional rangefinder apparatus, there are cases where a regulator IC and an arithmetic circuit or the like are disposed in different printed circuit boards, or are connected to each other with a long wire. As a consequence, even when a voltage-stabilizing capacitor C is attached to the output terminal of the regulator IC A as shown in FIG. 6, if the arithmetic circuit B is connected thereto with a long wire D, noises will be likely to be superposed on the power source voltage of the arithmetic circuit B, whereby the voltage will tend to fluctuate.

Figure 7:
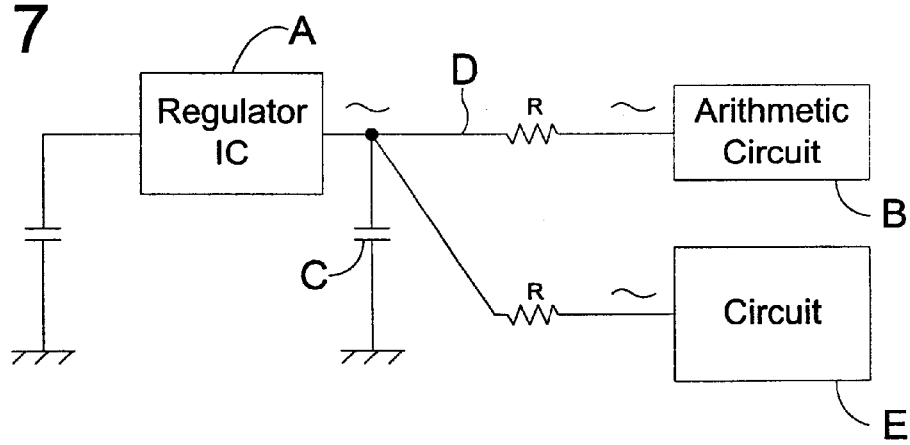
FIG. 7 is an explanatory view of related art.

If a capacitor C is disposed at the connecting portion of the arithmetic circuit B as shown in FIG. 7 in order to stabilize the power source voltage of the arithmetic circuit B, on the other hand, the voltage near the output terminal of the regulator IC A may fluctuate due to the noise generated from another circuit E, thus causing the power source voltage of the arithmetic circuit B to fluctuate in response thereto. As measures against this phenomenon, the power source voltage wiring may be provided with a number of capacitors C. Providing a number of capacitors C, however, increases the number of components, thereby raising the cost of components and causing the rangefinder apparatus to become bulky.

In the rangefinder apparatus in accordance with this embodiment, the number of capacitors installed for stabilizing the output voltage of the step-down regulator 4 can be reduced, whereby the cost of components can be cut down. Also, as the number of installed capacitors is reduced, the rangefinder apparatus 1 can be made small.

Though the range finder apparatus 1 employed in a still camera is explained in this embodiment, the rangefinder apparatus in accordance with the present invention is not limited thereto but may also be used in a video camera and the like which necessitate a range-finding function.

Second Embodiment

Though the step-down regulator 4 and the AFIC 5 are different ICs and are disposed in their respective printed circuit boards 11 and 12 in the above-mentioned rangefinder apparatus 1 in accordance with the first embodiment, they may be provided in the same printed circuit board or built in the same IC.

Figure 4:
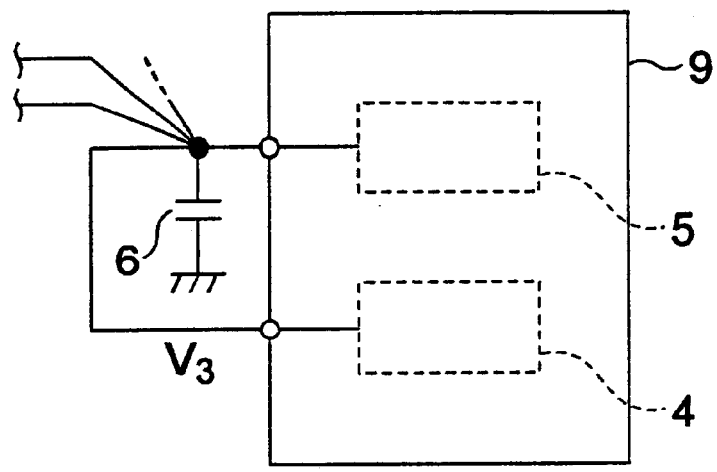
FIG. 4 is an explanatory view of the rangefinder apparatus in accordance with a second embodiment.

For example, when the step-down regulator 4 and the AFIC 5 are built in one IC 9 in the rangefinder apparatus 1 as shown in FIG. 4, it will be sufficient if the stabilizing capacity 6 is disposed near the power terminal of the AFIC 5, and a wire is drawn out from near the connecting portion of the stabilizing capacity 6, so as to supply the depressed voltage V3 to various electronic components such as PSD 81. Consequently, as in the rangefinder apparatus 1 in accordance with the first embodiment, the voltage fluctuation in the depressed voltage V3 supplied to the AFIC 5 can be suppressed, so as to eliminate noises, and normal operations of the AFIC 5, which is likely to be influenced by power source fluctuations and the like, can reliably be secured. Also, a common impedance can be prevented from occurring due to the wiring for connecting the individual electronic components such as PSD 81, whereby the power source voltage of the AFIC 5 can be stabilized, and a stable power source voltage can be supplied to each electronic component. As a consequence, the power source voltage can efficiently be stabilized in each component of the rangefinder apparatus 1.

Figure 5:
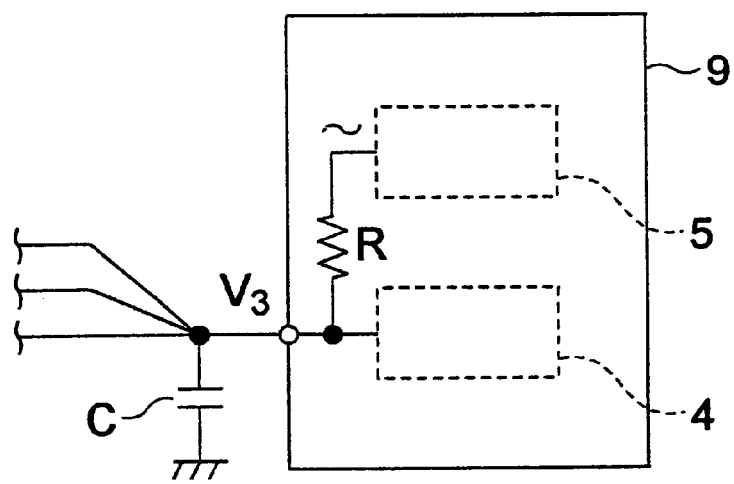
FIG. 5 is an explanatory view of a rangefinder apparatus on which the rangefinder apparatus in accordance with the second embodiment is based.

By contrast, if the stabilizing capacity 6 is not disposed near the power terminal of the AFIC 5 when the step-down regulator 4 and the AFIC 5 are built in one IC 9 as shown in FIG. 5, the AFIC 5 will be connected to a long wire, whereby noises will be likely to be superposed on the power source voltage, and the voltage will tend to fluctuate.

As explained in the foregoing, the present invention can yield the following results.

Namely, as a stabilizing capacity is disposed near the power terminal of the signal processing means, which is likely to be influenced by fluctuations in the power source voltage, the depressed voltage can efficiently be stabilized. As a consequence, the number of capacitors installed for stabilizing the depressed voltage can be reduced, whereby the cost of components can be cut down. Also, as the number of installed capacitors is reduced, the rangefinder apparatus can be made smaller.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rangefinder apparatus comprising:

light-emitting means for projecting light toward a range-finding object;

light-detecting means for detecting light projected from said light-emitting means to and reflected by the range-finding object and outputting a signal according to a position at which the light is detected;

a battery for supplying a power source voltage;

step-up means for raising the power source voltage of said battery to a raised voltage;

step-down means for receiving the raised voltage outputted from said step-up means and outputting a depressed voltage lower than the raised voltage;

signal processing means, actuated upon receiving the depressed voltage, for outputting a signal corresponding to a distance to the range-finding object or a signal for generating the signal corresponding to the distance to the range-finding object; and a stabilizing capacitor, connected between a location near a power terminal of said signal processing means receiving the depressed voltage and a location near a grounding terminal of said signal processing means, for stabilizing the depressed voltage wherein the depressed voltage is fed into said light-detecting means by a wire extending from a connecting portion of said stabilizing capacitor.

2. A rangefinder apparatus comprising:

light-emitting means for projecting light toward a range-finding object;

light-detecting means for detecting light projected from said light-emitting means to and reflected by the range-finding object and outputting a signal according to a position at which the light is detected;

a battery for supplying a power source voltage;

step-up means for raising the power source voltage of said battery to a raised voltage;

step-down means for receiving the raised voltage outputted from said step-up means and outputting a depressed voltage lower than the raised voltage;

signal processing means, actuated upon receiving the depressed voltage, for outputting a signal corresponding to a distance to the range-finding object of a signal for generating the signal corresponding to the distance to the range-finding object; and a stabilizing capacitor, connected between a location near a power terminal or said signal processing means receiving the depressed voltage and a location near a grounding terminal of said signal processing means, for stabilizing the depressed voltage wherein the depressed voltage is fed into an electronic component other than said signal processing means by a wire extending from a connecting portion of said stabilizing capacitor.

* * * * *